April 9, 1968  R. O. BORTON ET AL  3,377,103
VENTILATED CUSHION AND METHOD OF MAKING SAME
Filed Aug. 17, 1966
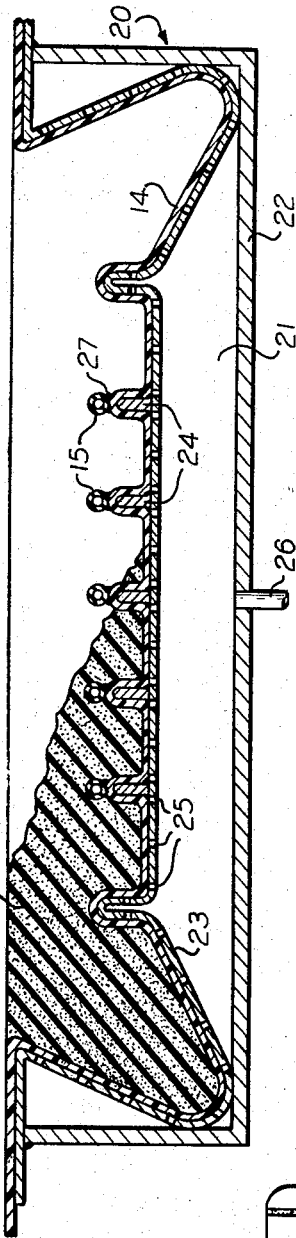
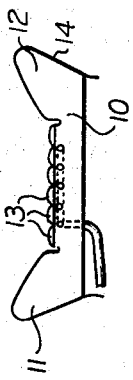
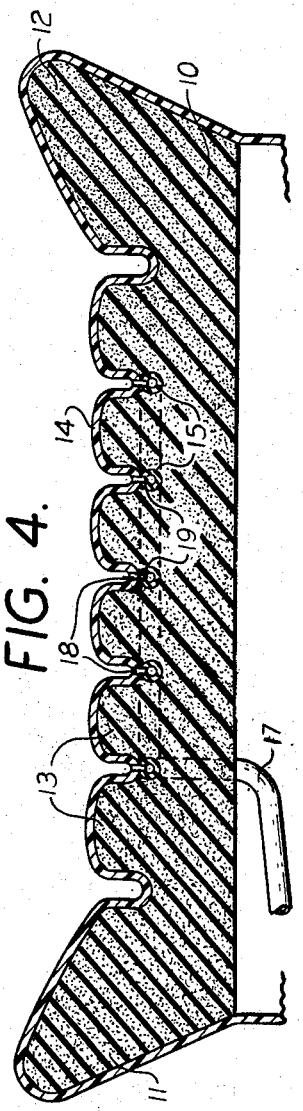
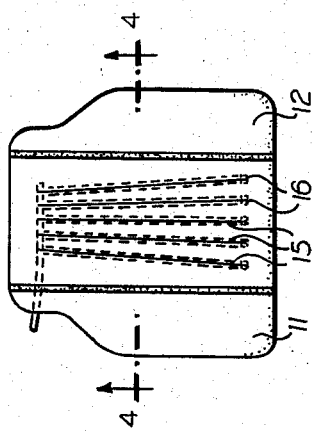
INVENTORS
ROBERT O. BORTON
GARVIN L. BECK
BY James R. Hulen
ATTORNEY.

United States Patent Office 3,377,103
Patented Apr. 9, 1968

3,377,103
VENTILATED CUSHION AND METHOD OF MAKING SAME
Robert O. Borton, South Bend, Ind., and Garvin L. Beck, Santa Ana, Calif., assignors to United States Rubber Company, New York, N.Y., a corporation of New Jersey
Filed Aug. 17, 1966, Ser. No. 573,043
3 Claims. (Cl. 297—453)

ABSTRACT OF THE DISCLOSURE

A ventilated foam seat cushion having a cover in contact with the seat portion of the foam and air conduits located under and in contact with the cover so that air may be forced through aligned apertures in the conduits and cover to ventilate the seat portion of the cushion without contacting the foam with the forced air.

---

This invention relates to a new covered foam cushion construction and, more particularly, to a ventilated foam cushion having means for forcing air onto the seat portion thereof and to a method for making said cushion.

The ventilation of plastic covered foam cushions is very desirable since an unventilated cushion becomes hot and uncomfortable during long periods of use. A problem confronted in previous attempts to provide ventilating means for foam cushions was the direct contact of the ventilating air with the foam material. This contact of large amounts of air with the foam causes rapid oxidation and premature deterioration of the foam.

Accordingly, it is an object of this invention to provide a ventilating means embedded in a foam cushion and capable of directing air onto the seat portion of the cushion without contacting the foam with the air.

A further object is to provide a ventilating means in direct contact with the covering material, but sufficiently embedded in the foam to be relatively undetectable from the seat portion of the cushion, thus, creating no discomfort to the user.

A still further object it to provide a simple and effective method for making the cushion construction of the subject invention.

The above and other objects are accomplished in accordance with this invention which comprises a cushion having a foam body portion; a cover secured to at least the seat portion of the foam, the cover having an aperture extending therethrough, a conduit partially embedded in the foam in contact with the inner surface of the cover; the conduit having an aperture extending through one wall thereof in alignment with the aperture in the cover; and means for forcing air into the conduit and through the apertures to the outer surface of said cover.

The cushion is made in accordance with the method of this invention which comprises the steps of conforming a covering material to the contour of a cushion mold; placing at least one conduit partially in the mold in contact with the covering material; filling the mold with foam; curing the foam; whereby, the covering material becomes secured to the foam and the conduit becomes embedded in the foam in contact with the inner surface of the cover; removing the fabric-covered foam from the mold; and forming apertures through the cover and one wall of the conduit to communicate the interior of the conduit with the outer surface of the cover.

For a better understanding of the present invention together with other and further objects thereof, reference is made to the following description, taken in connection with the accompanying drawing, and its scope will be pointed out in the appended claims.

Referring now to the drawing:

FIG. 1 is a fragmentary cross-sectional view of a vacuum mold used to construct the cushion of the present invention;

FIG. 2 is a top plan view of a ventilated cushion made in accordance with the present invention;

FIG. 3 is a front elevation of a cushion made in accordance with the present invention; and FIG. 4 is a cross-sectional view of the cushion taken along line 4—4 in FIG. 2.

The cushion is illustrated in FIGS. 2, 3 and 4 as a bucket-type seat having a body portion 10 with laterally extending portions 11 and 12 and a plurality of longitudinally extending ribs 13. Body portion 10 is preferably constructed to latex foam material, however other foams, such as, polyurethane and vinyl foams may be usable with this invention. Since latex foam is most susceptible to oxidation when contacted with air, this invention has the most utility with cushions constructed of latex foam. Although this invention is illustrated as a bucket-type seat construction, it will be apparent that the invention has utility with other types and shapes of cushions.

A covering material 14 is secured to the seat portion of the foam and is conformed to the contour of ribs 13. Covering material 14 may be a vinyl or other plastic sheet or a vinyl or plastic coated fabric.

A plurality of conduits 15 are embedded in body portion 10 in contact with fabric 14 at the base portion of each rib 13. Conduits 15 are sealed at one end at 16 (see FIG. 2) and are interconnected at their other ends by a conduit 17 which extends outwardly from the body portion 10. Conduit 17 is connected to an air source (not shown) and is adapted to supply air to the interior of conduits 15. Although the invention is illustrated with a plurality of conduits 15, a single conduit arranged in a serpentine pattern throughout the cushion would be equally as effective for distributing air to the seat portion of the cushion.

Although it is not critical, a soft flexible neoprene rubber is used for conduits 15. It is important that the conduits remain flexible over a reasonable temperature range and that they be unaffected by the air flowing therethrough. Also, the softness and flexibility of the rubber renders the conduits relatively undetectable from the seat portion of the cushion and creates no discomfort to the user.

Referring to FIG. 4, apertures 18 are formed through the covering material 14 at the base of ribs 13 where the covering material is in contact with conduits 15. Likewise, apertures 19 are formed through the wall of conduits 15 in alignment with apertures 18. Consequently, air forced through conduit 17 into the interior of conduits 15 will pass upwardly through apertures 19 and apertures 18 onto the seat portion of the cushion. The deep indentations between ribs 13 remove conduits 15 a sufficient distance from the outer seat portion that the conduits are virtually undetectable and yet are effective to supply an appropriate amount of ventilating air to the seat portion.

Referring now to FIG. 1, the method for constructing the ventilated foam cushion of the present invention will now be described in detail. A vacuum mold shown generally at 20 is utilized to conform the covering material 14 to the desired cushion contour and to subsequently receive the liquid foam for molding the foam to said desired contour. Mold 20 has a vacuum chamber 21 formed between an outer mold member 22 and an inner contoured mold member 23. Vertical ribs 24 are secured to the upper portion of mold member 23 to provide the indentations between ribs 13 on the finished cushion. A plurality of apertures 25 are formed through the contoured mold member 23 to provide communication between the outer mold surface and vacuum chamber 21. A conduit 26 connects vacuum chamber 21 to a vacuum source (not shown).

In the construction of the cushion, covering material 14 is placed over mold 20 and vacuum formed to the contour of the mold in a conventional manner. With the cover thus formed, conduits 15 are secured to the inner surface of the cover along the upper portion of vertical ribs 24. A neoprene solvent cement or other suitable cement, shown at 27 in FIG. 1, may be used to firmly secure conduits 15 directly in contact with cover 14. Conduit 17 is secured to conduits 15 either before or after the placement of conduits 15 in contact with cover 14.

A liquid foam 28 is directed into mold 20 in the usual manner and the foam is cured. The curing of foam 28 firmly bonds cover material 14 to the foam, and conduits 15 become embedded permanently in the foam. After the curing operation, the entire cushion assembly is removed from mold 20 and apertures 18 and 19 are formed through cover 14 and a wall of conduits 15, respectively. The number and size of apertures 18 and 19 are primarily determined by the volume of air that is desired on the seat portion of the cushion. For example, in the cushion illustrated in the drawing, 25 apertures, each $1/16$ inch diameter, were formed through the cover and wall of the conduits to accommodate 10,000 cubic centimeters per minute of air.

It will be obvious from the foregoing that the present invention provides a seat cushion construction that is easily ventilated without an accompanying deleterious effect on the foam rubber and without creating a discomfort to the user. These conditions are created by embedding the air conduits a sufficient distance below the seat portion of the cushion in direct contact with the indented cover material.

While there has been described what is at present considered to be the preferred embodiment of this invention, it will be obvious to those skilled in the art that various changes and modifications may be made therein without departing from the invention, and it is therefore aimed to cover all such changes and modifications as fall within the true spirit and scope of the invention.

Having thus described our invention, what we claim and desire to protect by Letters Patent is:

1. A ventilated seat cushion comprising: a foam body portion; a cover secured to at least the seat portion of said foam, said cover having an aperture extending therethrough; a conduit partially embedded in said foam in contact with the inner surface of said cover, said conduit having an aperture extending through one wall thereof in alignment with said aperture in said cover; and means for forcing air into said conduit and through said apertures to the outer seat portion of said cover.

2. The cushion of claim 1, wherein said seat portion of said foam is inwardly indented and said conduit contacts said cover in the area of said indentation.

3. The cushion of claim 1, wherein said seat portion of said foam is formed with a plurality of ribs having indentations therebetween, said cover being conformed to the contour of said ribs and indentations and having a plurality of apertures extending therethrough at the base of said indentations; and a plurality of conduits partially embedded in said foam in contact with said cover, said conduits having a plurality of apertures through one wall thereof in alignment with the apertures in said cover.

References Cited

UNITED STATES PATENTS

| 2,283,116 | 5/1942 | Young. |
| 2,750,606 | 6/1956 | Freedlander et al. |
| 2,826,135 | 3/1958 | Benzick. |
| 2,826,244 | 3/1958 | Hurley. |
| 3,331,089 | 7/1967 | Ornas et al. _____ 5—347 |

FOREIGN PATENTS

| 742,101 | 11/1943 | Germany. |
| 730,477 | 5/1955 | Great Britain. |

CASMIR A. NUNBERG, *Primary Examiner.*